3,773,814
COMPLEX COMPOUNDS OF IRIDIUM AND
PROCESS FOR PREPARING SAME
Federico Maspero, Milan, and Emilio Perrotti, San
Donato Milanese, Italy, assignors to Snam Progetti
S.p.A., San Donato Milanese, Italy
No Drawing. Filed Oct. 13, 1971, Ser. No. 189,048
Claims priority, application Italy, Oct. 13, 1970,
30,897/70
Int. Cl. C07f 15/00
U.S. Cl. 260—429 R          13 Claims

ABSTRACT OF THE DISCLOSURE

There are provided novel complex compounds of the general formula $$(L)_n\text{—Me—Me—}(L)_n$$

wherein Me is Ir, and L is a complexing compound selected from phosphines. The new complexes are prepared by transforming a compound of iridium into at least a partial hydride, then dehydrogenating this in the presence of a hydrogen acceptor and of a complexing agent. The new complex compounds have catalytic activity, e.g., in the transfer of hydrogen in unsaturated compounds.

---

The present invention relates to new complex compounds of certain metals belonging to the 8th group of the periodic system, particularly to iridium compounds and to process for preparing the same. More particularly, it relates to new complex compounds of the above metals containing intermetallic bonds.

Iridium "clusters" are known from the literature which have the formula:

$$Ir_n(CO)_m$$

in which $n$ is an integer selected between 2 and 3, $m$ is a number higher than $n$ and generally lower than 6, and carbon oxide may be bridge bound or be a terminal group (see, for example, F. Calderazzo, R. Ercoli, G. Natta in "Organic Syntheses Via Metal Carbonyls," Ed. I. Wender, P. Pino; J. Wiley IM York, 1968). By the term "clusters" we mean all the compounds containing intermetallic bonds (see, for example, the bibliographic citation).

We have now found new complexes of iridium in which there are molecules of complexing compounds, also different from carbon oxide, while the same metals present intermetallic bonds.

The complexing or ligand compounds are selected from a wide class of well-known complexing compounds. Among the latter, preferred mention is made of those belonging to phosphines, stibines, arsines or alkyl-, aryl-, halogen alkyl, halogen-aryl derivatives of same.

Our new complex compounds have the general formula:

(I)          $(L)_n\text{—Me—Me—}(L)_n$ wherein Me is Ir, L is a complexing compound selected from phosphines, stibines, arsines, alkyl-, aryl, alkyl-aryl, halogen-alkyl or halogen-aryl-derivatives of the same, and preferably consisting of the aromatic phosphines; and $n$ may be 2, 3 or 4.

The iridium is one of a series of coordination metals; particularly, those which are three-coordinated, so showing interesting catalyst properties; in fact they are very good catalysts in the hydrogenation, dehydrogenation carboxylation reactions and the like.

The preparation of the iridium complex compounds, which is a further object of the present invention, may be carried out by starting from inorganic salts of iridium or by starting from complex compounds already having the ligands of the final product in the molecule.

In the first case, use may be made of any metal compound and preferably of $Na_2MeCl_6$, $Na_2MeBr_6$, $MeCl_3$, $MeBr_3$, $Me(NO_3)_3$, $Me_2(SO_4)_3$, $Me(ClO_4)_3$. In the second case, it is possible to start from compounds having the formula:

(II)          $MeX_{n_1} \cdot Z_{m_1}$ wherein Me is Ir; X consists of anionic groups selected from Cl⁻, Br⁻, I⁻ and hydride-nitro-, nitrosyl, thiocyano or cyano groups; $m_1$ is a number selected between 2 and 3; $n_1$ is an integer such as 1 or 3; Z is a ligand selected from carbon monoxide, phosphines, arsines, stibines, alkyl-, aryl-, halogenalkyl, halogenaryl derivatives of the same, olefins, diolefins or isonitriles. In the case where the ligand Z of the compound II is different from L of the Formula I, it will be replaced by adding the L ligands as reactants. The general process as aforesaid, with the exception of possible modifications known to those skilled in the art, consists of a reduction reaction bringing the iridium to low oxidation state; for this purpose, use may be made of any reducing agent, particularly of alkali or alkaline-earth metal hydrides and more particularly of sodium boronhydride owing to its easy availability. If the reaction is carried out in unreacting solvents of the aromatic hydrocarbon type, hydride complexes are obtained having various compositions and generally an indefinite one.

We have now surprisingly found that if the aforesaid reduction process is followed by a chemical treatment of the solutions with unsaturated compounds having the structure:

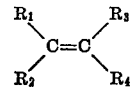

R being hydrogen, alkyl or aryl groups, the compounds I are isolated by evaporating the final solutions. During this performance great care must be taken to ensure the absence of moisture and molecular oxygen, because of the high reactivity of such complexes which decompose easily.

The compounds I show a good catalyst activity, particularly in the reaction transfer of hydrogen among the molecules of unsaturated compounds which give rise to dienes and saturated hydrocarbons at high yields and selectivity, which is the object of a copending patent application.

The following examples are not to be intended as restrictive of the invention:

EXAMPLE 1

A complex having the formula $IrHI_2[P(\phi)_3]_2$ or $$IrH_2IP(\phi)_3$$

wherein $P(\phi)_3$ is triphenylphosphine, was reacted with sodiumboronhydride (0.12 mole) in absolute ethyl alcohol, and set free from gas at 30—40° C. for about 3 hours under a nitrogen atmosphere. Then 50 cc. of anhydrous and degassed benzene were added. To the stirred mixture a propylene stream was added for about two hours at 50° C. The solution was evaporated and the residue dissolved in anhydrous benzene, filtered and again dried. The obtained product could be crystallized by slowly concentrating the solvent from the solution.

The complex structure was determined by means of N.M.R., I.R., molecular weight, elementary analysis. Particularly, the I.R. and N.M.R. spectra confirmed the presence of phosphine ligands, the absence of hydride bands or of some other signals attributable to alkyl or alkenyl derivatives. The elementary analyses agreed with the structure; the molecular weight determination gave values in the range of about 1450±5%.

EXAMPLE 2

One millimole of the iridium hydride complex

Benzene was suspended in a few cc. of benzene and isoamylene (5 mmoles) was added. In a closed system, the temperature was raised to 50–60° C. for about 3 hours. The solution was filtered and the solvent evaporated. The so-obtained solid residue showed the same physical-chemical characteristics as the preceding product.

What we claim is:

1. Complex compounds having the general formula:

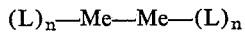

wherein Me is iridium and L is triphenyl phosphine and $n$ is 2, 3 or 4.

2. A process for preparing compounds according to claim 1 consisting in transforming an inorganic compound of iridium into an at least partially hydride compound which, by dehydrogenation in presence of a hydrogen acceptor having the general formula:

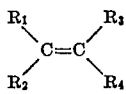

wherein the R's are hydrogen, alkyl or aryl groups and of a complexing agent selected from an aromatic phosphine, an olefin, a diolefin, carbon monoxide or an isonitrile, is changed into

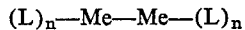

wherein M, L and $n$ have the aforesaid meanings.

3. A process according to claim 2 characterized in that the starting compound of iridium has the formula

in which Me is iridum, X is I$^-$ or hydride; $n_1$ is an integer of 1 or 3; $m_1$ is a number selected from 2 and 3; Z is a ligand selected from an aromatic phosphine, an olefin, a diolefin, carbon monoxide or an isonitrile.

4. A process according to claim 3 characterized in that the compound $MeX_{n1}Z_{m1}$ is selected among $IrHI_2(P\phi_3)_3$, $IrH_2I(P\phi_3)_3$, $IrH_3(P\phi_3)_2$.

5. A process according to claim 2 in which the iridium is changed into a hydride compound by reacting with a hydride reagent, said hydride compound being then reacted with a hydrogen acceptor.

6. A process according to claim 3 characterized in that the complex compound is changed into a hydride compound by reacting with an alkali metal hydride or alkaline-earth metal hydride reagent, said hydride compound being reacted with a hydrogen acceptor in a single reaction medium or in some unreacting mediums, and, if the ligand Z is different from L, the reaction medium being fed by L in amounts suitable to replace Z.

7. A process according to claim 5 characterized in that the hydrogen acceptor is a compound having the general formula:

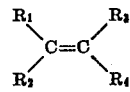

wherein the R's are hydrogen, alkyl or aryl groups.

8. A process according to claim 2 characterized in that the reaction is carried out at a temperature above room temperature and in absence of moisture and oxygen or compounds able to liberate oxygen.

9. A process according to claim 7 characterized in that said hydrogen acceptor is propylene.

10. A process according to claim 7 characterized in that said hydrogen acceptor is amylene.

11. A process according to claim 5 wherein said hydride reagent is an alkali metal hydride or alkaline earth metal hydride.

12. A process according to claim 11 wherein said hydride reagent is sodium boron hydride.

13. A process according to claim 6 wherein said hydride reagent is sodium boron hydride.

References Cited
UNITED STATES PATENTS

| | | | |
|---|---|---|---|
| 3,458,547 | 7/1969 | Coffey | 260—429 R |
| 3,489,780 | 1/1970 | Thompson | 240—429 R |
| 3,538,133 | 11/1970 | Knoth | 260—429 R |

WERTEN F. W. BELLAMY, Primary Examiner